United States Patent [19]

Grantham et al.

[11] Patent Number: 5,419,886
[45] Date of Patent: May 30, 1995

[54] METHOD FOR GENERATION OF FINELY DIVIDED REACTIVE PLUTONIUM OXIDE POWDER

[75] Inventors: LeRoy F. Grantham, Calabasas; Richard L. Gay, Chatsworth, both of Calif.

[73] Assignee: Rockwell International Corporation, Seal Beach, Calif.

[21] Appl. No.: 207,518

[22] Filed: Mar. 8, 1994

[51] Int. Cl.$^6$ ............................................. C01G 56/00
[52] U.S. Cl. ........................... 423/251; 423/253; 423/255; 423/261; 423/256; 376/422; 252/637; 252/638; 252/639; 252/640
[58] Field of Search ............... 252/637, 638, 639, 640; 423/251, 253, 255, 261, 256; 376/422

[56] References Cited

U.S. PATENT DOCUMENTS

| | | | |
|---|---|---|---|
| 3,294,493 | 12/1966 | Jonke et al. | 23/324 |
| 3,314,865 | 4/1966 | Kleinpeter et al. | 204/2.5 |
| 3,483,913 | 12/1969 | Grosvenor et al. | 27/20 |
| 3,717,582 | 2/1973 | Lindermer et al. | 252/301 R |
| 3,923,933 | 12/1975 | Lay | 265/0.5 |
| 4,003,980 | 1/1977 | Watt et al. | 423/261 |
| 4,271,102 | 6/1981 | Arovat et al. | 264/0.5 |
| 4,296,074 | 10/1981 | Yosim | 423/4 |
| 4,297,174 | 10/1981 | Brambilla et al. | 204/1.5 |
| 4,338,215 | 7/1982 | Shaffer et al. | 252/628 |
| 4,388,273 | 6/1983 | Graf, Jr. et al. | 422/117 |
| 4,397,778 | 8/1983 | Lloyd | 252/627 |
| 4,409,157 | 10/1983 | Haas et al. | 264/0.5 |
| 4,493,809 | 1/1985 | Simnad | 376/171 |
| 4,965,024 | 10/1990 | Wood | 264/0.5 |
| 5,009,817 | 4/1991 | Hodgson | 264/0.5 |
| 5,041,193 | 8/1991 | Grantham | 204/1.5 |

OTHER PUBLICATIONS

Airox Dry Reprocessing of Uranium Oxide Fuels, R. C. Hoyt, L. F. Grantham, R. G. Clark and P. W. Twichell, DOE Research and Development Report, Subcontract No. 31-109-38-4564, Issued Jul. 12, 1979.

Review Of The Literature For Dry Reprocessing Oxide, Metal, and Carbide Fuel-The Airox, Rahyd, and Carbox, Pyrochemical Processes, R. C. Hoyt and B. W. Rhee, Rockwell International Internal Report No. ES-G-DOE-13277, LMFBR Fuel Recycle UC-79c, Issued Sep. 30, 1979.

*Primary Examiner*—Donald P. Walsh
*Assistant Examiner*—Meena Chelliah
*Attorney, Agent, or Firm*—H. Fredrick Hamann; Harry B. Field; Steven E. Kahm

[57] ABSTRACT

A method of preparing active, sinterable, finely-divided plutonium oxide ($PuO_2$) powder from plutonium metal is disclosed. The process yields plutonium fissile material which can be easily blended to form a uniformly homogeneous powder for the fabrication of high-quality light water reactor ceramic fuel pellets. Such homogeneous fuels are required to prevent hot spots from developing in a reactor using the fuel.

20 Claims, 1 Drawing Sheet

METHOD FOR GENERATION OF FINELY DIVIDED REACTIVE PLUTONIUM OXIDE POWDER

BACKGROUND OF THE INVENTION

Post-cold war nuclear weapons demilitarization is expected to yield tonnes of fissile material which must be destroyed rapidly to assure complete unrecoverable weapon demilitarization. An effective, efficient, and economical method of destroying this fissile material is to mix it with spent nuclear fuel that has been reprocessed by the AIROX (Atomics International Reduction Oxidation) method [AIROX Dry Reprocessing of Uranium Oxide Fuels, DOE Research and Development Report, Rockwell International, Report No. ESD-DOE-13276]. The mixture can then be transmuted in light water reactors (LWRs) with concurrent electric power generation.

To form a suitable powder for fabrication of high-quality LWR oxide fuel ceramic-pellets, the feed (i.e., fuel) material must be well-mixed, finely divided, and reactive under pressing and sintering conditions. Therefore, the enrichment material prepared from demilitarization of nuclear-weapons must also be very finely-divided reactive $PuO_2$ powder.

In order for the fissile plutonium (Pu) to form an enrichment material for AIROXed spent fuel, however, it must be converted to a fine (<200 mesh) reactive plutonium oxide ($PuO_2$) powder. Normally plutonium metal is converted to $PuO_2$ powder by slow combustion. This does not, however, necessarily produce a fine reactive powder and can produce very unreactive (e.g., high-fired) oxide. High fired oxide (i.e., oxide heated at 550° C. for over an hour) is very unreactive, forms poor-quality LWR oxide fuel pellets, and could easily be separated from the $PuO_2$ already in AIROXed spent fuel even after mixing by simple dissolution of the AIROXed produced $PuO_2$ in 2N $HNO_3$ (PUREX) process.

Fissile, high-fired $PuO_2$ will not dissolve in 2N $HNO_3$. AIROXed $PuO_2$ is easily dissolved in 2N $HNO_3$. Therefore, a method is needed which renders weapons grade plutonium to a form which is (1) reactive for fuel fabrication and (2) readily dissolves in 2N $HNO_3$.

SUMMARY OF THE INVENTION

A method in accordance with the invention converts weapons grade plutonium into a fine reactive plutonium oxide ($PuO_2$) powder for use as a fuel supplement in light water reactors (LWRs) or oxide fueled fast reactors. The method also produces a fine $PuO_2$ powder that cannot be easily separated from non-fissile plutonium isotopes. A noncombustive technique is used to produce a fine reactive plutonium oxide ($PuO_2$) powder that is suitable for use with recycled AIROXed (Atomics International Reduction Oxidation) fuel and that cannot be separated once mixed.

One method of producing such a powder is to hydride the plutonium metal into thin flakes and then steam-oxidize these flakes into high-grade, finely-divided (<200 mesh), reactive $PuO_2$ powder. This powder can be well-mixed (blended) with AIROXed spent fuel (containing roughly 1.5%, by weight, fissile material), re-enriching the spent fuel to roughly 3.5% by weight, fissile material (i.e. adding approximately 2%, by weight, $PuO_2$ powder). Once blended with the recycled AIROXed spent fuel the originally weapons grade plutonium is essentially inseparable from the $PuO_2$ of the recycled fuel. Thus, even if the plutonium were to be recovered, it would be below weapons grade material, significantly decreasing its thermonuclear yield and complicating illicit diversion to military use because of its orders of magnitude greater radioactivity (Pu-241, of recycled fuel, has a half-life of approximately 14 years and high specific activity, versus weapons-grade Pu-239, with a half-life of approximately 24,000 years).

The blended powder may be fabricated into ceramic pellets by conventional pressing and sintering. The pellets may be centerless ground, to proper dimensions if necessary, and loaded into zircoloy cladding in the usual manner. The cladding can be welded into fuel pins which, in turn, may be assembled into LWR fuel assemblies. These assemblies may then be loaded into a LWR where the plutonium would be transmuted back down to about 1.5% fissile. The spent fuel may then be stored at the reactor site (for approximately 5 years) to allow its short-lived fission products to decay and then be recycled again via the AIROX process for reenrichment and recycled back to the reactor.

DETAILED DESCRIPTION

Figure 1:
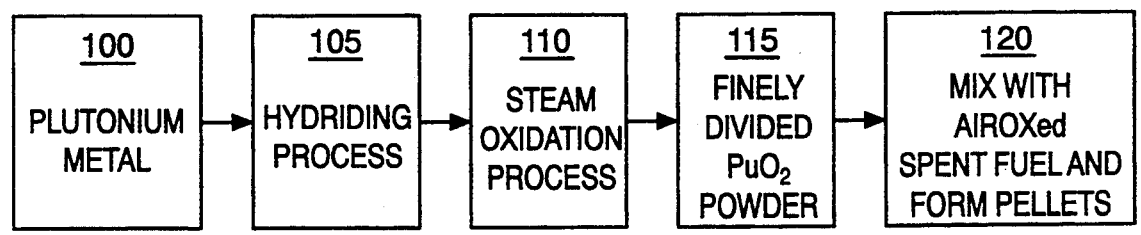
FIG. 1 is a block diagram representation of a method to convert plutonium metal into a finely divided plutonium oxide powder.

FIG. 1 outlines the method of the invention. Plutonium (Pu) metal 100 is first converted to a hydride via a hydriding process 105 which results in plutonium hydride ($PuH_2$) flakes. Next, the $PuH_2$ flakes are subjected to a steam oxidation process 110 to produce a finely divided reactive plutonium oxide ($PuO_2$) powder 115. A final step in the method of the invention may be to form fuel pellets from the finely divided $PuO_2$ powder 115 and mix them with AIROXed processed spent fuel, 120.

In alternative embodiments, the plutonium metal could be coated with carbon (from the decomposition of methane or other carbonaceous material) to produce plutonium carbide, or bathed in nitrogen to produce plutonium nitride. Either operation could substitute for the hydriding process of the invention's preferred embodiment.

Advantageous qualities of the invention include:

1. Unrecoverable destruction of weapons grade plutonium and uranium. Weapons grade plutonium (Pu-239) and uranium (uranium highly enriched in the U-235 isotope) is present in the majority of thermonuclear weapons. For the purpose of this explanation it is assumed that approximately 10 kg of weapons grade plutonium (or uranium) is either in each weapon or in the supply train (i.e. Rocky Flats type reprocessing) to keep the weapon in service. When spent fuel is removed from pressurized water reactors (PWRs), about 40% of the fissioning that occurred at the end of the fuel life are plutonium fissions; this plutonium is generated from uranium feed by neutron absorption of $U_{238}$ while the fissile U-235 in the feed was fissioning. Spent PWR fuel contains about 0.9%, by weight, U-235 and about 0.9%, by weight, plutonium of which only about 70%, by weight, is the fissile Pu-239 isotope used in nuclear weapons.

As nuclear weapons are demilitarized the fissile plutonium (Pu-239) or uranium (U-235) must be destroyed to prevent reuse in weapons. The method of the invention converts weapons grade plutonium metal and uranium metal to an oxide, blends it with AIROXed recycled spent fuel, and burns (transmutes) it to fission products in the reactor. Existing PWRs can be utilized without modification to destroy this demilitarized fissile material. Other PWRs can be used after minor modifications.

2. Minimize the time required for accountability of demilitarized plutonium or uranium to only a few months. Weapons grade material accountability is required while the weapons grade material could be diverted by terrorists groups or government agencies to refabricate nuclear weapons from the material. After about two months of fissioning in a reactor, the spent fuel is so radioactive that special facilities are needed to handle the radioactive material and if the fuel rods are opened, gaseous radioactive isotopes are evolved during fuel processing which are readily detectable with airborne monitors.

Thus, accountability would be required only during (1) fabrication of fuel, (2) transport of fuel to the reactor, (3) insertion of the fuel into the reactor, and (4) during the first few months of operation of the reactor. After this time, further accountability is not needed until the reactor is scheduled for refueling (about 12-20 months).

3. Provides uranium or plutonium fissile material that can be uniformly and easily blended to obtain a homogeneous fuel. Uniformly mixed powders are required to produce fuels of the correct density to avoid cladding ruptures and hot spots within an operational reactor. Depending on the reactor, fuels of less than theoretical densities are required. In general, fuel densities of 85%±5%, by weight, are required by most of the reactor designs now in operation. With a homogeneously-mixed, finely-divided feed, fuel of the desired different densities can be fabricated in the same fuel production facility with only minor modifications in the process operations.

4. Allows use of existing fuel fabrication facilities to start, or complete, destruction of demilitarized fissile material. Existing light water reactors (LWRs) can be used to transmute demilitarized fissile material as it becomes available. About 15% of the PWRs can be used without modification to burn plutonium based fuels. Additional PWRs can be used with only minor modifications. Those 15% of existing PWRs could handle about 10 tonnes/year of demilitarized plutonium. Assuming the United States has 10,000 nuclear weapons, each with 10 Kg of plutonium, then 100,000 Kg or 100 tonnes of plutonium must be destroyed if all nuclear weapons were demilitarized. Of course, only a portion of the weapons will be demilitarized over a period of years. Therefore, the existing PWRs that can be fueled with mixed oxides (mixed uranium-plutonium oxide fuel) can handle destruction of any demilitarized plutonium as it becomes available. Any LWR can burn demilitarized uranium providing a capacity to transmute approximately 100 tonnes/year of fissile uranium, while only a few tonnes/year would be available from demilitarization.

Currently, existing facilities cannot be used to recycle AIROXed fuel because of the high radiation level of this material. Using the method of the invention however, existing facilities could be used with only minor modifications (enhanced security, accountability and operating permit modifications) to fabricate fuel that uses AIROXed depleted uranium as the fertile feed stream. (A fertile material is one which, through the absorption of a neutron and one or more intermediary decay steps, becomes a fissile material. For instance, U-238 is a fertile material: U-238+neutron→U-239; U-239−$\beta^-$→Np-239; Np-239−$\beta^-$→Pu-239.) Existing facilities fabricate about 100 tonnes/year of LWR fuel. Only 7–10% of this capacity would be required to handle demilitarized plutonium as it becomes available.

5. Prevents easy recovery of plutonium or uranium. The method of the invention denatures either feed material (plutonium or uranium) and prevents easy subsequent separation.

6. Creates a resource from waste. Refueling LWRs (refueled every 10–20 months) with fuel containing demilitarized fissile material generated by the method of the invention would destroy this material while producing electrical power.

7. Solves spent fuel storage problem. Re-enriching AIROXed spent fuel via the method of the invention will decrease the amount of spent fuel in storage. This would make room for more spent fuel in the reactor storage system and thus more nuclear power could be generated before a reactor exceeds its spent fuel storage capacity.

8. Economic benefit. It has been estimated by the Department of Energy that it may cost up to $0.5 million to dispose of each cubic foot of spent fuel. Thus there is an economic advantage to using the spent fuel to refuel reactors.

4.1 Introduction

Plutonium metal must be oxidized very carefully to obtain an active, sinterable, and finely divided powder. Direct oxidation will produce a high-fired, inactive, grainy material that has poor sintering properties. The process of direct oxidation may also become uncontrolled, producing a plutonium fire.

In addition, $PuO_2$ powder and uranium oxide ($UO_2$) powder must be finely divided in order to produce a homogeneous mixture. (It is important to produce a homogeneous $PuO_2$–$UO_2$ mixture to avoid hot spots in the recycled fuel when returned to a neutron flux.) In accordance with the invention, finely-divided, highly-sinterable, $UO_2$ powder may be produced in combination with the AIROX process, which can be conventionally used to declad and pulverize spent LWR fuel. It is also necessary to have an active, sinterable powder to get the oxide grains to fuse together during the sintering process to form properly-sized, reproducibly-dimensioned, evenly-dense, sintered pellets that can be remotely-inspected and remotely-loaded into fuel cladding.

4.2 Example Embodiment

Figure 2:
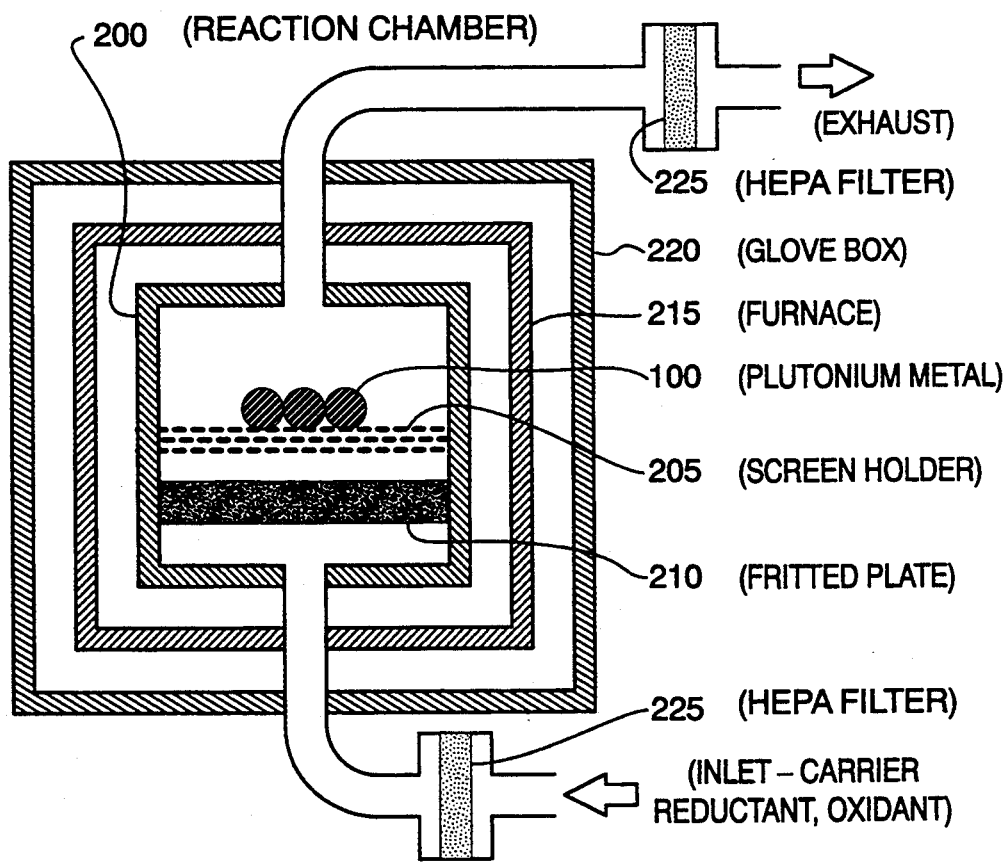
FIG. 2 is a block diagram representation of an apparatus to implement the method of the invention.

FIG. 2 shows an apparatus that implements the method of the invention. A small piece of plutonium metal 100 is placed on a coarse screen 205 above a fritted glass holder 210 in a reaction chamber 200 so that the hydridation and oxidation of the plutonium metal can be observed. The reaction chamber may be constructed of, for example, the well-known Vycor material. Surrounding the reaction chamber is a furnace 215 which, in turn, is placed within a glove-box 220. Gas feed and exhaust tubes are attached to the inlet and outlet of the reaction chamber 200. Small HEPA (High Efficiency Particulate Air) filters 225 are installed in the gas feed and gas exhaust lines to contain any airborne plutonium particulates.

Argon carrier gas—containing reductant gas hydrogen, $H_2$, during the hydridation process and containing oxidant gas oxygen, $O_2$, during the oxidation process—flows upward through the fritted glass support 210, around the plutonium metal 100, and out the reaction chamber's radioactive exhaust system.

4.2(a) Hydriding Process

The temperature of the reaction chamber 200 is increased to 425±50 C. from ambient, and argon carrier gas flow is started. Hydrogen flow into the carrier gas is then initiated and increased slowly every few minutes (e.g., 5 volume percent every 10 minutes) while the reaction temperature is monitored until the carrier gas is about 20 (±5) volume percent hydrogen. The carrier gas flow at this $H_2$ concentration is continued until the hydridation process is complete. Once the hydridation process is complete, the hydrogen is turned off and purged from the reaction chamber for approximately five minutes. The plutonium metal completely decrepitates (crackles) into small flakes of plutonium hydride $PuH_2$.

Hydriding plutonium metal produces thin flakes of $PuH_2$ that continue to peel away and decrepitate from the metal's surface as the hydride is formed. While $PuH_2$ will form at room temperatures up to the melting point of plutonium, 640 C., a hydriding temperature of 400±100 C. is presently preferred. At this temperature the hydriding reaction is rapid and continuous until all of the plutonium has been converted into small, thin, $PuH_2$ flakes.

The concentration of hydrogen in the inert carrier gas can be as high as about 20 volume percent and still not form an explosive mixture if the gas happens to leak into air. The presently preferred concentration of hydrogen in argon is about 15±5 volume percent.

The hydrating rate increases with higher temperatures and higher $H_2$ concentration. However, since the hydriding reaction is quite exothermic the hydriding rate should be slow enough to prevent the temperature of the plutonium metal from exceeding its melting point.

4.2(b) Oxidation Process

The oxidation process, which converts $PuH_2$ to $PuO_2$ is begun once the hydridation process is complete and the reaction chamber 200 has been swept with an inert gas such as argon.

The oxidation process is started by increasing the reaction chamber's temperature to 475±50 C. and beginning carrier gas flow. The carrier gas flow is re-routed to bubble through water at 46 C. so that it will contain about 10±5 volume percent water vapor. The water in the oxidizing gas acts as a catalyst to initiate the oxidation reaction and helps to control the rate of oxidation once the oxidation starts.

Oxidant gas (oxygen) flow is started and increased slowly (e.g., 3 volume percent every 7 minutes) as the reaction temperature is monitored until the carrier gas is about 20±5 volume percent oxygen, $O_2$. The carrier gas flow with this concentration of $O_2$ is maintained until the $PuH_2$ is completely converted to $PuO_2$. The $O_2$ is then turned off and the system purged with the carrier gas before it is opened in the inert gas atmosphere glove box 220.

Like the hydridation reaction, the oxidation reaction is quite exothermic. Therefore, the concentration of $O_2$ in carrier gas should be low enough initially to prevent heating the $PuO_2$ to above about 550 C. to avoid accidental deactivation of the resulting $PuO_2$ powder. The oxidation temperature should be maintained preferably at about 475±50 C. while the oxygen content of the carrier gas is slowly increased from near zero to about 20 volume percent. The temperature of the $PuH_2$–$PuO_2$ mixture should be followed closely so that the temperature does not exceed 550 C. as the oxygen content is increased.

4.2(c) Comments

The primary purpose of choosing the above-mentioned concentrations of reducing and oxidizing gases is to prevent an explosive mixture of hydrogen from forming accidentally. If an inert atmosphere glove box 220 is used and engineering controls employed to ensure the hydrogen mixture can never mix with the oxidizing gas or air, then higher concentrations of hydrogen and oxygen in the carrier gas can be used as long as the plutonium metal is not melted or the $PuO_2$ is not deactivated.

After this process, examination of the plutonium indicates that it is a finely divided powder which passes through a 325 mesh sieve. Analysis indicates the stoichiometry is essentially $PuO_2$. When the $PuO_2$ is blended with $UO_2$ a homogeneous mixture is attained within the accuracy of the analysis. The resulting blend can be hot pressed and sintered producing a fuel pellet having a uniform density.

Thus, it is shown plutonium metal can be converted to an active, sinterable, finely-divided $PuO_2$ powder and that this powder can be blended with $UO_2$ to form a homogeneous mixture which can be sintered into uniform density fuel pellets.

It will be appreciated by those of ordinary skill having the benefit of this disclosure that numerous variations from the foregoing illustration will be possible without departing from the inventive concept described herein. For instance, the above cited oxidation, reduction, and pelletization conditions could be changed somewhat to achieve specific goals. Examples of these changes include: (1) instead of hydriding, the plutonium metal might first be converted into plutonium carbide or plutonium nitride; (2) prepelletization, grinding, sieving, and mixing of various sized sieve streams could be used to obtain the desired theoretical pellet density upon final hot pressing and sintering; (3) a preprocessing hydrogen reduction of the $PuO_2$ powder could be used to obtain the desired substoichiometric oxide powder for pelletization; (4) conventional die lubricants such as stearic acid and mold release additives could be used during pelletization if desired; and (5) AIROX processed uranium is not the only source of uranium oxide that can be used as a mixing agent, virgin uranium oxide or depleted uranium oxide may also be used. Accordingly, it is the claims set forth below, and not merely the foregoing illustration, which are intended to define the exclusive rights claimed in this application program.

What is claimed is:

1. A method of making nuclear fuel comprising the steps of:

(a) bonding plutonium metal atoms to one or more atoms of an element selected from the group consisting of hydrogen, carbon, and nitrogen, to form an intermediate compound comprising plutonium hydride, plutonium carbide, or plutonium nitride;

(b) oxidizing the intermediate compound to form plutonium oxide powder;

(c) mixing said plutonium oxide powder with uranium oxide powder to form a homogeneous fuel mixture; and (d) sintering said homogeneous fuel mixture to form fuel pellets.

2. A method of converting plutonium metal into a fine reactive plutonium oxide ($PuO_2$) powder, comprising the steps of:

(a) hydriding said plutonium metal into plutonium hydride ($PuH_2$) flakes by bathing said plutonium metal with a hydriding fluid stream comprising gaseous hydrogen ($H_2$); and (b) oxidizing said $PuH_2$ flakes into $PuO_2$ powder by bathing said plutonium hydride flakes with an oxidizing fluid stream comprising gaseous oxygen ($O_2$).

3. The method of claim 2, wherein said hydriding fluid stream further comprises an inert carrier fluid.

4. The method of claim 2, wherein said oxidizing fluid stream further comprises an inert carrier fluid.

5. The method of claim 3, wherein said inert carrier fluid comprises argon gas.

6. The method of claim 4, wherein said inert carrier fluid comprises argon gas.

7. The method of claim 2, wherein said plutonium metal is weapons-grade plutonium metal.

8. The method of claim 2, wherein said plutonium oxide powder ($PuO_2$) is sufficiently fine and sufficiently reactive to be mixable with uranium oxide ($UO_2$) powder for pressing and sintering into uniformly dense fuel pellets.

9. The method of claim 2, further comprising the step of mixing said plutonium oxide powder homogeneously with spent nuclear fuel to generate a new fuel.

10. The method of claim 2, wherein said hydriding step 2 (a) is performed in a reaction chamber and comprises the substeps of:

(a)(1) establishing the temperature of said reaction chamber at 425±50 C.;

(a)(2) initiating a carder fluid flow into said reaction chamber, said carrier fluid flow comprising an inert fluid;

(a)(3) adding gaseous hydrogen ($H_2$) into said carrier fluid flow at a rate which increases the concentration of $H_2$ in said carrier fluid flow by about 5 volume percent per 10 minutes, until said carrier fluid flow contains 20±5 volume percent $H_2$;

(a)(4) continuing said carrier fluid flow into said reaction chamber with 20±5 volume percent $H_2$ until said plutonium metal is substantially completely hydrided; and (a)(5) purging said reaction chamber with a flushing fluid.

11. The method of claim 10, wherein said inert fluid comprises argon gas.

12. The method of claim 10, wherein said flushing fluid comprises argon gas.

13. The method of claim 2, wherein said oxidizing step 2 (b) is performed in a reaction chamber and comprises the steps of:

(b)(1) establishing the temperature of said reaction chamber at 475±50 C.;

(b)(2) initiating a carrier fluid flow comprising an inert fluid and 10 ±5 percent water vapor;

(b)(3) adding gaseous oxygen ($O_2$) into said carrier fluid flow at a rate which increases the concentration of $O_2$ in said carrier fluid flow by about 3 volume percent per 7 minutes, until said carrier fluid flow contains 20±5 volume percent $O_2$;

(b)(4) continuing said carrier fluid flow into said reaction chamber with 20±5 volume percent $O_2$ until said plutonium hydride is substantially completely oxidized; and (b)(5) purging said reaction chamber with a flushing fluid.

14. The method of claim 13, wherein said carrier fluid flow further comprises argon gas.

15. The method of claim 13, wherein said flushing fluid comprises argon gas.

16. A method of converting plutonium metal into a fine reactive plutonium oxide ($PuO_2$) powder in a reaction chamber, comprising the steps of:

(a) establishing the temperature of said reaction chamber at 425±50 C.;

(b) initiating a hydriding fluid flow into said reaction chamber, said hydriding fluid flow comprising an inert fluid;

(c) adding gaseous hydrogen ($H_2$) into said hydriding fluid flow at a rate which increases the concentration of $H_2$ in said hydriding fluid flow by about volume percent per 10 minutes, until said hydriding fluid flow contains 20±5 volume percent $H_2$;

(d) continuing said hydriding fluid flow into said reaction chamber with 20±5 volume percent $H_2$ until said plutonium metal is substantially completely hydrided;

(e) purging said reaction chamber with a flushing fluid;

(f) establishing the temperature of said reaction chamber at 475±50 C.;

(g) initiating an oxidizer fluid flow comprising an inert fluid and 10 ±5 percent water vapor;

(h) adding gaseous oxygen ($O_2$) into said oxidizer fluid flow at a rate which increases the concentration of $O_2$ in said oxidizer fluid flow by about 3 volume percent per 7 minutes, until said oxidizer fluid flow contains 20±5 volume percent $O_2$;

(i) continuing said oxidizer fluid flow into said reaction chamber with 20±5 volume percent $O_2$ until said plutonium hydride is substantially completely oxidized; and (j) purging said reaction chamber with a flushing fluid.

17. The method of claim 16, wherein said inert fluid comprises argon gas.

18. The method of claim 16, wherein said flushing fluid comprises argon gas.

19. A nuclear fuel comprising a substantially homogeneous mixture of (a) plutonium oxide powder formed by a method in accordance with a specified one of claims 2 through 18, and (b) uranium oxide.

20. A method of making nuclear fuel comprising the steps of:

(a) establishing the temperature of said reaction chamber at 425±50 C.;

(b) initiating a hydriding fluid flow into said reaction chamber, said hydriding fluid flow comprising argon;

(c) adding gaseous hydrogen ($H_2$) into said hydriding fluid flow at a rate which increases the concentration of $H_2$ in said hydriding fluid flow by about 5 volume percent per 10 minutes, until said hydriding fluid flow contains 20±5 volume percent $H_2$;

(d) continuing said hydriding fluid flow into said reaction chamber with 20±5 volume percent $H_2$ until said plutonium metal is substantially completely hydrided;

(e) purging said reaction chamber with argon fluid;

(f) establishing the temperature of said reaction chamber at 475±50 C.;

(g) initiating an oxidizer fluid flow comprising argon fluid and 10 ±5 percent water vapor;

(h) adding gaseous oxygen ($O_2$) into said oxidizer fluid flow at a rate which increases the concentration of $O_2$ in said oxidizer fluid flow by about 3 volume percent per 7 minutes, until said oxidizer fluid flow contains 20±5 volume percent (i) continuing said oxidizer fluid flow into said reaction chamber with 20±5 volume percent $O_2$ until said plutonium hydride is substantially completely oxidized into a plutonium oxide ($PuO_2$) powder;

(j) purging said reaction chamber with argon fluid;

(k) mixing said $PuO_2$ powder with AIROX generated uranium oxide powder to form a homogeneous fuel mixture; and (l) sintering said homogeneous fuel mixture to form fuel pellets.

* * * * *

UNITED STATES PATENT AND TRADEMARK OFFICE
CERTIFICATE OF CORRECTION

PATENT NO. : 5,419,886
DATED : May 30, 1995
INVENTOR(S) : LeRoy F. Grantham and Richard L. Gay It is certified that error appears in the above-identified patent and that said Letters Patent is hereby corrected as shown below:

Column 7, line 48, item 10(a)(2): Delete "carder" and insert "carrier"

Column 8, line 31, item 16(c): add "5" before volume percent ...

Column 10, line 5, item 20(h): add "$O_2$;" after volume percent (end of line)

Signed and Sealed this

Fifteenth Day of August, 1995

Attest:

Attesting Officer

BRUCE LEHMAN
Commissioner of Patents and Trademarks